US011930571B2

(12) United States Patent
Hsia

(10) Patent No.: US 11,930,571 B2
(45) Date of Patent: Mar. 12, 2024

(54) SOLID-STATE LIGHTING WITH A LUMINAIRE PHASE-DIMMING DRIVER

(71) Applicant: Aleddra Inc., Renton, WA (US)

(72) Inventor: Chungho Hsia, Bellevue, WA (US)

(73) Assignee: Aleddra Inc., Rentaon, WA (US)

(*) Notice: Subject to any disclaimer, the term of this patent is extended or adjusted under 35 U.S.C. 154(b) by 128 days.

(21) Appl. No.: 17/857,807

(22) Filed: Jul. 5, 2022

(65) Prior Publication Data

US 2022/0338321 A1 Oct. 20, 2022

Related U.S. Application Data

(63) Continuation-in-part of application No. 17/839,179, filed on Jun. 13, 2022, now Pat. No. 11,510,296, which is a continuation-in-part of application No. 17/735,002, filed on May 2, 2022, now Pat. No. 11,490,476, which is a continuation-in-part of application No. 17/717,838, filed on Apr. 11, 2022, now Pat. No. 11,846,396, which is a continuation-in-part of application No. 17/696,780, filed on Mar. 16, 2022, which is a continuation-in-part of application No. 17/405,203, filed on Aug. 18, 2021, now Pat. No. 11,283,291, which is a continuation-in-part of application No. 17/329,018, filed on May 24, 2021, now Pat. No. 11,303,151, which is a continuation-in-part of application No. 17/313,988, filed on May 6, 2021, now Pat. No. 11,264,831, which is a continuation-in-part of application No. 17/213,519, filed on Mar. 26, 2021, now Pat. No. 11,271,422, which is a continuation-in-part of application No.

(Continued)

(51) Int. Cl.
*H05B 45/325* (2020.01)
*H05B 45/31* (2020.01)

(52) U.S. Cl.
CPC .......... *H05B 45/325* (2020.01); *H05B 45/31* (2020.01)

(58) Field of Classification Search
None
See application file for complete search history.

(56) References Cited

U.S. PATENT DOCUMENTS

| | | | | |
|---|---|---|---|---|
| 10,485,073 B1 * | 11/2019 | Hsia | .................. | H02M 3/33561 |
| 10,492,265 B1 * | 11/2019 | Hsia | .................. | H05B 45/385 |
| 10,992,161 B2 * | 4/2021 | Hsia | .................. | H05B 45/3725 |

* cited by examiner

*Primary Examiner* — Anh Q Tran
(74) *Attorney, Agent, or Firm* — Han IP PLLC; Andy M. Han

(57) ABSTRACT

A light-emitting diode (LED) luminaire phase-dimming driver comprises a first power supply circuit, a second power supply circuit, and an interface control circuit. The second power supply circuit is configured to convert a constant voltage generated from the first power supply circuit into an output direct-current (DC) voltage to dim an external LED luminaire in response to a phase-dimming signal abstracted from a phase-cut mains voltage no matter whether the external LED luminaire is originally dimmable or not. The second power supply circuit is further configured to receive a pulse-width modulation (PWM) signal and to control the output DC voltage in response to the PWM signal. The interface control circuit comprises a relay switch configured to sense the phase-dimming signal and to control switching between an intermediate voltage and the output DC voltage to operate the external LED luminaire without flickering.

19 Claims, 3 Drawing Sheets

Related U.S. Application Data

17/151,606, filed on Jan. 18, 2021, now Pat. No. 11,259,386, which is a continuation-in-part of application No. 17/122,942, filed on Dec. 15, 2020, now Pat. No. 11,265,991, which is a continuation-in-part of application No. 17/099,450, filed on Nov. 16, 2020, now Pat. No. 11,264,830, which is a continuation-in-part of application No. 17/076,748, filed on Oct. 21, 2020, now Pat. No. 11,271,388, which is a continuation-in-part of application No. 17/026,903, filed on Sep. 21, 2020, now Pat. No. 11,271,421, which is a continuation-in-part of application No. 17/016,296, filed on Sep. 9, 2020, now Pat. No. 11,259,374, which is a continuation-in-part of application No. 16/989,016, filed on Aug. 10, 2020, now Pat. No. 11,122,658, which is a continuation-in-part of application No. 16/929,540, filed on Jul. 15, 2020, now Pat. No. 11,116,057, which is a continuation-in-part of application No. 16/904,206, filed on Jun. 17, 2020, now Pat. No. 11,102,864, which is a continuation-in-part of application No. 16/880,375, filed on May 21, 2020, now Pat. No. 11,172,551, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

SOLID-STATE LIGHTING WITH A LUMINAIRE PHASE-DIMMING DRIVER

CROSS-REFERENCE TO RELATED APPLICATIONS

The present disclosure is part of a continuation-in-part (CIP) application of U.S. patent application Ser. No. 17/839,179, filed 13 Jun. 2022, which is part of CIP application of U.S. patent application Ser. No. 17/735,002, filed 2 May 2022, which is part of CIP application of U.S. patent application Ser. No. 17/717,838, filed 11 Apr. 2022, which is part of CIP application of U.S. patent application Ser. No. 17/696,780, filed 16 Mar. 2022, which is part of CIP application of U.S. patent application Ser. No. 17/405,203, filed 18 Aug. 2021 and issued as U.S. Pat. No. 11,283,291 on 22 Mar. 2022, which is part of CIP application of U.S. patent application Ser. No. 17/329,018, filed 24 May 2021 and issued as U.S. Pat. No. 11,303,151 on 12 Apr. 2022, which is part of CIP application of U.S. patent application Ser. No. 17/313,988, filed 6 May 2021 and issued as U.S. Pat. No. 11,264,831 on 1 Mar. 2022, which is part of CIP application of U.S. patent application Ser. No. 17/213,519, filed 26 Mar. 2021 and issued as U.S. Pat. No. 11,271,422 on 8 Mar. 2022, which is part of CIP application of U.S. patent application Ser. No. 17/151,606, filed 18 Jan. 2021 and issued as U.S. Pat. No. 11,259,386 on 22 Feb. 2022, which is part of CIP application of U.S. patent application Ser. No. 17/122,942, filed 15 Dec. 2020 and issued as U.S. Pat. No. 11,265,991 on 1 Mar. 2022, which is part of CIP application of U.S. patent application Ser. No. 17/099,450, filed 16 Nov. 2020 and issued as U.S. Pat. No. 11,264,830 on 1 Mar. 2022, which is part of CIP application of U.S. patent application Ser. No. 17/076,748, filed 21 Oct. 2020 and issued as U.S. Pat. No. 11,271,388 on 8 Mar. 2022, which is part of CIP application of U.S. patent application Ser. No. 17/026,903, filed 21 Sep. 2020 and issued as U.S. Pat. No. 11,271,421 on 8 Mar. 2022, which is part of CIP application of U.S. patent application Ser. No. 17/016,296, filed 9 Sep. 2020 and issued as U.S. Pat. No. 11,259,374 on 22 Feb. 2022, which is part of CIP application of U.S. patent application Ser. No. 16/989,016, filed 10 Aug. 2020 and issued as U.S. Pat. No. 11,122,658 on 14 Sep. 2021, which is part of CIP application of U.S. patent application Ser. No. 16/929,540, filed 15 Jul. 2020 and issued as U.S. Pat. No. 11,116,057 on 7 Sep. 2021, which is part of CIP application of U.S. patent application Ser. No. 16/904,206, filed 17 Jun. 2020 and issued as U.S. Pat. No. 11,102,864 on 24 Aug. 2021, which is part of CIP application of U.S. patent application Ser. No. 16/880,375, filed 21 May 2020 and issued as U.S. Pat. No. 11,172,551 on 9 Nov. 2021, which is part of CIP application of U.S. patent application Ser. No. 16/861,137, filed 28 Apr. 2020 and issued as U.S. Pat. No. 10,992,161 on 27 Apr. 2021, which is part of CIP application of U.S. patent application Ser. No. 16/830,198, filed 25 Mar. 2020 and issued as U.S. Pat. No. 10,869,373 on 15 Dec. 2020, which is part of CIP application of U.S. patent application Ser. No. 16/735,410, filed 6 Jan. 2020 and issued as U.S. Pat. No. 10,660,179 on 19 May 2020, which is part of CIP application of U.S. patent application Ser. No. 16/694,970, filed 25 Nov. 2019 and issued as U.S. Pat. No. 10,602,597 on 24 Mar. 2020, which is part of CIP application of U.S. patent application Ser. No. 16/681,740, filed 12 Nov. 2019 and issued as U.S. Pat. No. 10,959,310 on 23 Mar. 2021, which is part of CIP application of U.S. patent application Ser. No. 16/664,034, filed 25 Oct. 2019 and issued as U.S. Pat. No. 10,660,184 on 19 May 2020, which is part of CIP application of U.S. patent application Ser. No. 16/572,040, filed 16 Sep. 2019 and issued as U.S. Pat. No. 10,645,782 on 5 May 2020, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 19 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaire phase-dimming drivers and more particularly to an LED luminaire driver controllable by a phase-dimming controller to regulate output power of the LED luminaire according to a phase-dimming signal without flickering.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential health concerns such as temporal light artifacts become especially important and need to be well addressed.

In today's retrofit application of an LED luminaire to replace an existing fluorescent luminaire, consumers may choose either to adopt a ballast-compatible luminaire with an existing ballast used to operate the fluorescent luminaire or to employ an alternate current (AC) mains-operable LED luminaire by removing/bypassing the ballast. Either application has its advantages and disadvantages. In the former case, although the ballast consumes extra power, it is straightforward to replace the fluorescent luminaire without rewiring, which consumers have a first impression that it is the best alternative to the fluorescent luminaire. But the fact is that total cost of ownership for this approach is high regardless of very low initial cost. For example, the ballast-compatible luminaire works only with particular types of ballasts. If the existing ballast is not compatible with the ballast-compatible luminaire, the consumer will have to replace the ballast. Some facilities built long time ago incorporate different types of fixtures, which requires extensive labor for both identifying ballasts and replacing incompatible ones. Moreover, a ballast-compatible luminaire can operate longer than the ballast. When an old ballast fails, a new ballast will be needed to replace in order to keep the ballast-compatible luminaire working. Maintenance will be complicated, sometimes for the luminaires and sometimes for the ballasts. The incurred cost will preponderate over the initial cost savings by changeover to the ballast-compatible luminaire for hundreds of fixtures throughout a facility. When the ballast in a fixture dies, all the ballast-compatible luminaires in the fixture go out until the ballast is replaced. In addition, replacing a failed ballast requires a certified electrician. The labor costs and long-term maintenance costs will be unacceptable to end users. From energy saving point of view, the ballast constantly draws power, even when the ballast-compatible luminaires are dead or not installed. In this sense, any energy saved while using the ballast-compatible luminaire becomes meaningless with the constant energy use by the ballast. In the long run, the ballast-compatible luminaires are more expensive and less efficient than self-sustaining AC mains-operable luminaires.

On the contrary, an AC mains-operable luminaire does not require the ballast to operate. Before use of the AC mains-operable luminaire, the ballast in a fixture must be removed or bypassed. Removing or bypassing the ballast does not require an electrician and can be replaced by end users. Each AC mains-operable luminaire is self-sustaining. If one AC mains-operable luminaire in a fixture goes out, other luminaires or lamps in the fixture are not affected. Once installed, the AC mains-operable luminaire will only need to be replaced after 50,000 hours.

Light dimming can provide many benefits such as helping create an atmosphere by adjusting light levels, which reduces energy consumption and increases operating life of an LED lighting luminaire. Light dimmers are devices coupled to the lighting luminaire and used to lower the brightness of light. By changing the voltage waveform applied to the LED lighting luminaire, it is possible to lower the intensity of the light output, so called light dimming. Modern light dimmers are based on four dimming protocols, namely, mains dimming, DALI (Digital Addressable Lighting Interface), DMX (Digital Multiplex), and analog dimming, among which both DALI and DMX need a transmitter and a receiver. The analog dimming uses a direct current (DC) signal (0-10 V) between a control panel and an LED driver. As the direct DC signal voltage changes, the light output changes. However, the analog dimming needs an extra wire on a single channel basis when installed in a dimming system. Mains dimming, the oldest dimming protocol, is a type that can still widely be seen in homes, schools, and many other commercial places. A mains dimming or a phase-dimming system relies on reducing an input voltage to the LED lighting luminaire, typically by 'chopping-out' part of a line voltage from the AC mains, a so called phase-cut line voltage. There is no need to install the extra wire in an area that requires light dimming. However, the LED luminaire with a driver controllable by a mains dimmer (i.e., a power-line dimmer or a phase-cut dimmer) needs a special filter design and exists an inherent drawback such as an incompatibility between the power-line dimmer and the LED luminaire, which causes possible flickering of the LED luminaire. The analog dimming using a low-voltage DC signal between the control panel and the LED driver does not have any compatibility issue. Nevertheless, almost all of LED luminaires already installed in industries do not comprise any analog dimming ports and are regarded as non-dimmable. The market requires a general-purpose dimming driver that can be used to convert all of LED luminaires that are originally designed as non-dimmable into dimmable ones. In this disclosure, such a general-purpose dimming driver uses a phase-dimming technology with an advantage of no need to install the extra wire and is regarded as a most cost-effective way to implement in the area that needs light dimming. Such a phase-dimming driver configured to convert a constant voltage from a power supply circuit into an output DC voltage to dim an external LED luminaire in response to a phase-dimming signal will be addressed.

SUMMARY

An LED luminaire phase-dimming driver comprises two electrical conductors, at least one full-wave rectifier, a first power supply circuit, a second power supply circuit, and an interface control circuit. The two electrical conductors "L" and "N" are configured to receive an input voltage, either a phase-cut mains voltage from an external phase-dimming controller or a line voltage from the AC mains when the external phase-dimming controller is not present. The at least one full-wave rectifier is coupled to the two electrical conductors and configured to convert the input voltage into a non-regulated DC voltage. The first power supply circuit is configured to convert the non-regulated DC voltage into a first regulated DC voltage and an intermediate voltage. The second power supply circuit is configured to convert the first regulated DC voltage into an output DC voltage to drive an external LED luminaire in presence of a phase-dimming signal no matter whether the external LED luminaire is originally designed as dimmable or not. The second power supply circuit is further configured to receive a pulse-width modulation (PWM) signal and to control a magnitude of the output DC voltage in response to the PWM signal. The interface control circuit comprises a relay switch configured to sense the phase-dimming signal and to control switching between the intermediate voltage and the output DC voltage to operate the external LED luminaire.

The LED luminaire phase-dimming driver further comprises a first electro-magnetic interference (EMI) filter assembly and a latching and holding current sustainable circuit configured to compensate for a minimum current to operate the external phase-dimming controller, thereby eliminating a misfire from the external phase-dimming controller to cut a power to the first power supply circuit. The interface control circuit further comprises a central control circuit and a peripheral circuit configured to sample a fraction of the non-regulated DC voltage to deliver to the central control circuit to set up a switching start-time and to produce the phase-dimming signal. Specifically, the central control circuit is configured to produce both an analog signal and the PWM signal in response to the fraction of the non-regulated DC voltage. The PWM signal is sent to the second power supply circuit and configured to control the first converter circuit. The interface control circuit further comprises a first transistor circuit configured to receive the analog signal and to control the pick-up voltage to appear at the third pair of input electrical terminals. Specifically, the analog signal pulls down a voltage via the first transistor circuit, and then the pick-up voltage appears at the third pair of input electrical terminals. The coil senses a voltage potential difference between the third pair of input electrical terminals and operates. The first converter circuit is further configured to set up the output DC voltage with the regulated output current proportional to an input rated current of the external LED luminaire in response to the phase-dimming signal. When the coil operates, the output DC voltage is delivered to the pair of output electrical terminals. When the phase-dimming signal has not yet been built up, the analog signal remains a low level, and the pick-up voltage does not appear at the third pair of input electrical terminals. In this case, the coil remains normally off, and the intermediate voltage from the first pair of input electrical terminals is delivered to the pair of output electrical terminals to temporarily operate the external LED luminaire, effectively avoiding luminaire turn-on instability.

The first power supply circuit comprises a control device and a second converter circuit controlled by the control device and configured to generate the first regulated DC voltage higher than a maximum input operating voltage of the second converter circuit. The first regulated DC voltage appears at an output port of the second converter circuit with respect to the first ground reference. The second converter circuit is also configured to generate the intermediate voltage compatible to an operating voltage of the external LED luminaire. On the other hand, the first converter circuit is configured to receive both the first regulated DC voltage and the PWM signal to regulate the output DC voltage less than the first DC voltage with the regulated output current to operate the external LED luminaire in response to the PWM signal. The second converter circuit comprises a first electronic switch, one or more first capacitors, one or more first switching diodes, and a transformer comprising a primary winding connecting in a front end of the first electronic switch and a secondary winding. The first electronic switch is configured to turn on and off to respectively charge and discharge the primary winding and to regulate the first regulated DC voltage to be a constant voltage appearing across the one or more first capacitors. The one or more first switching diodes may comprise a plurality of diodes connected in parallel to accommodate a large current. The one or more first capacitors may comprise a plurality of capacitors connected in parallel for better filtering performance. In the second converter circuit, there may be a first current sensing resistor to monitor an operation of the second converter circuit and to feedback to the control device. The second converter circuit may further comprise one or more second capacitors, one or more second switching diodes, and a tertiary winding. When the first electronic switch is turned on and off to respectively charge and discharge the primary winding, the intermediate voltage is regulated and appears across the one or more second capacitors.

The first converter circuit is further configured to regulate the output DC voltage equal to or greater than a minimum input operating voltage of the external LED luminaire to operate thereof when the phase-dimming signal is present. Each time when the phase-dimming signal is changed, the relay switch is controlled to deliver the output DC voltage to operate the external LED luminaire in response to the phase-dimming signal that is changed. The regulated output current, however, presents a constant current reduction associated with the output DC voltage, thereby operating the external LED luminaire in response to the phase-dimming signal. The first converter circuit comprises one or more third capacitors, one or more third switching diodes, a second electronic switch, and a first inductor connecting between the one or more third capacitors and the second electronic switch configured to turn on and off to respectively charge and discharge the first inductor and to regulate the output DC voltage with the regulated output current to operate the external LED luminaire with a dimmable output light. The second electronic switch is further configured to be turned on according to an on-time of the PWM signal and a switching frequency. The on-time of the PWM signal varies according to the phase-dimming signal. A minimum on-time corresponds to a phase-dimming signal that produces a dimmest lighting luminance. The second power supply circuit further comprises a second transistor circuit comprising one or more second transistors configured to build up a switching control signal to turn on the second electronic switch and to enable the first converter circuit when the phase-dimming signal is present, thereby producing the output DC voltage in response to the PWM signal. The first converter circuit further comprises a second current sensing resistor configured to monitor an operation of the first converter circuit and to support regulating the output DC voltage in response to the PWM signal. The one or more third switching diodes may comprise a plurality of diodes connected in parallel to accommodate a large current. The one or more third capacitors may comprise a plurality of capacitors connected in parallel for better filtering performance. The transformer may further comprise an auxiliary winding whereas the second converter circuit may further comprise a rectified diode configured to sustain a power to operate the control device once the first electronic switch starts to turn on and off.

The LED luminaire phase-dimming driver further comprises a first internal power supply circuit configured to down-convert the first regulated DC voltage into a second regulated DC voltage with respect to the first ground reference to supply a power to the pick-up voltage to operate the coil. The first internal power supply circuit is also configured to build up the switching control signal that has an amplitude close to the second regulated DC voltage. The LED luminaire phase-dimming driver further comprises a second internal power supply circuit configured to down-convert the second regulated DC voltage into a third regulated DC voltage with respect to the first ground reference to supply a power to the central control circuit, thereby sustaining the analog signal and the PWM signal. Note that the one or more second transistors are further configured to up-convert the PWM signal received into the switching control signal with the amplitude close to the second regulated DC voltage, thereby supporting rapid switching of the second electronic switch and producing the output DC voltage in response to the switching control signal.

BRIEF DESCRIPTION OF THE DRAWINGS

Non-limiting and non-exhaustive embodiments of the present disclosure are described with reference to the following figures, wherein like names refer to like parts but their reference numerals differ throughout the various figures unless otherwise specified. Moreover, in the section of detailed description of the invention, any of a "primary", a "secondary", a "tertiary", a "first", a "second", a "third", and so forth does not necessarily represent a part that is mentioned in an ordinal manner, but a particular one.

DETAILED DESCRIPTION OF VARIOUS EMBODIMENTS

Figure 1:
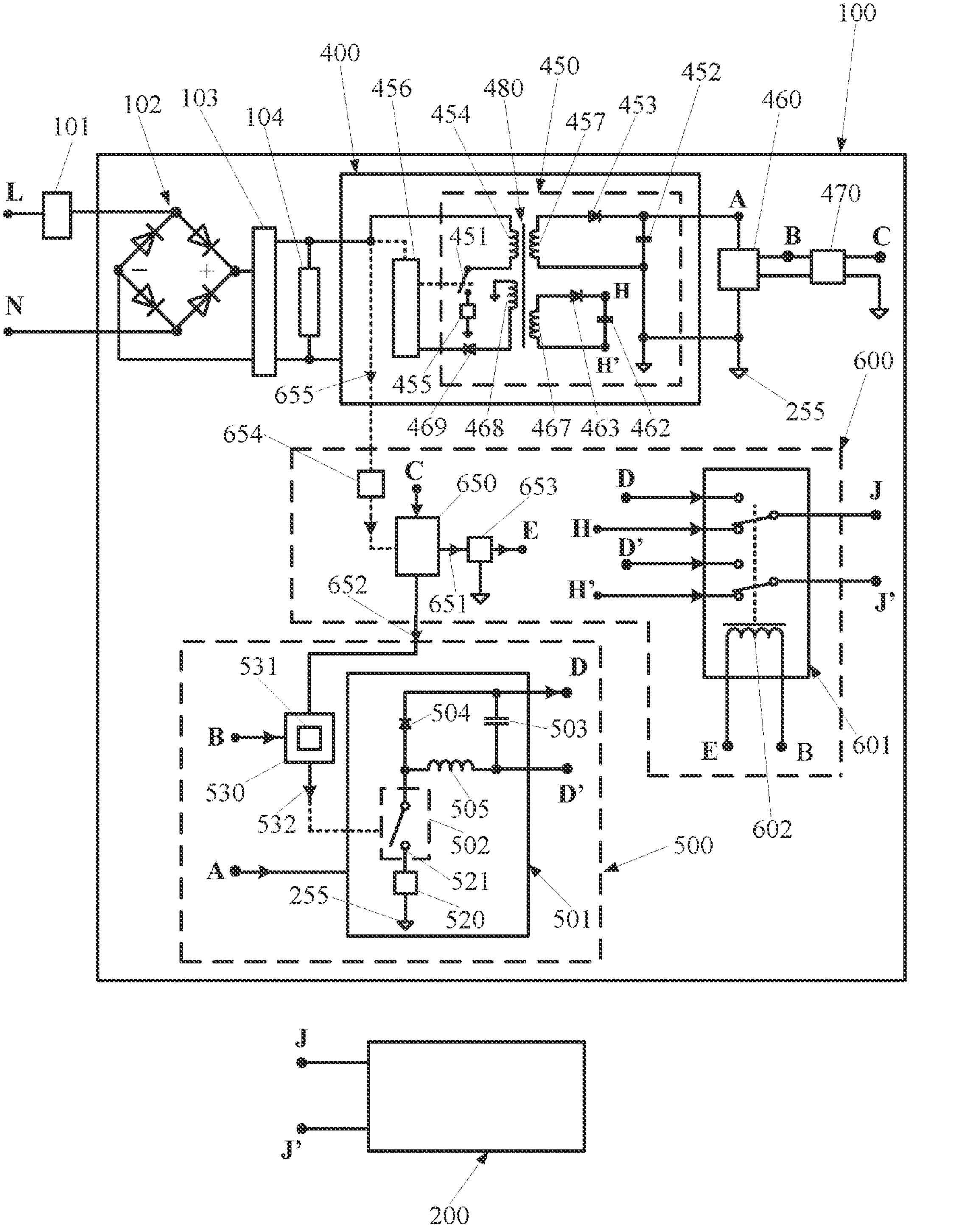
FIG. 1 is a block diagram of an LED luminaire phase-dimming driver according to the present disclosure.

FIG. 1 is a block diagram of an LED luminaire phase-dimming driver according to the present disclosure. The LED luminaire phase-dimming driver 100 comprises two electrical conductors "L" and "N", at least one full-wave rectifier 102, a first power supply circuit 400, a second power supply circuit 500, and an interface control circuit 600. The two electrical conductors "L" and "N" are configured to receive an input voltage, either a phase-cut mains voltage from an external phase-dimming controller 101 or a line voltage from AC mains when the external phase-dimming controller 101 is not present. The at least one full-wave rectifier 102 is coupled to the two electrical conductors "L" and "N" and configured to convert the input voltage into a non-regulated DC voltage. The first power supply circuit 400 is configured to convert the non-regulated DC voltage into a first regulated DC voltage and an intermediate voltage. The second power supply circuit 500 is configured to convert the first regulated DC voltage into an output DC voltage to drive an external LED luminaire 200 in presence of a phase-dimming signal no matter whether the external LED luminaire 200 is originally designed as dimmable or not. The second power supply circuit 500 is further configured to receive a pulse-width modulation (PWM) signal and to control a magnitude of the output DC voltage in response to the PWM signal. The interface control circuit 600 comprises a relay switch 601 configured to sense the phase-dimming signal and to control switching between the intermediate voltage and the output DC voltage to operate the external LED luminaire 200.

In FIG. 1, the second power supply circuit 500 comprises a first ground reference 255 and a first converter circuit 501 configured to convert the first regulated DC voltage into an output DC voltage with a regulated output current in response to a phase-dimming signal abstracted from the non-regulated DC voltage The interface control circuit 600 comprising a relay switch 601 configured to sense the phase-dimming signal and to control switching between the intermediate voltage and the output DC voltage to operate the external LED luminaire 200. The relay switch 601 comprises a coil 602 and is configured to relay either the intermediate voltage or the output DC voltage to the external LED luminaire 200 to operate thereof with improved stability.

The relay switch 601 further comprises a first pair of input electrical terminals denoted as "H" and "H'", a second pair of input electrical terminals denoted as "D" and "D'", a third pair of input electrical terminals denoted as "B" and "E", and a pair of output electrical terminals denoted as "J" and "J'". The third pair of input electrical terminals ("B" and "E") are configured to receive a pick-up voltage to operate the coil 602. The first pair of input electrical terminals ("H" and "H'") are configured to receive the intermediate voltage whereas the second pair of input electrical terminals ("D" and "D'") are configured to receive the output DC voltage. In other words, in response to the phase-dimming signal, the relay switch 601 is enabled to relay the output DC voltage to the pair of output electrical terminals ("J" and "J'") and to operate the external LED luminaire 200.

The LED luminaire phase-dimming driver 100 further comprises a first electro-magnetic interference (EMI) filter assembly 103 and a latching and holding current sustainable circuit 104 configured to compensate for a minimum current to operate the external phase-dimming controller 101, thereby eliminating a misfire from the external phase-dimming controller 101 to cut a power to the first power supply circuit 400. The interface control circuit 600 further comprises a central control circuit 650 and a peripheral circuit 654 configured to sample a fraction of the non-regulated DC voltage via a link 655 to deliver to the central control circuit 650 to set up a switching start-time and to produce the phase-dimming signal. Specifically, the central control circuit 650 is configured to produce both an analog signal and the PWM signal in response to the fraction of the non-regulated DC voltage. The PWM signal is sent via a second link 652 to the second power supply circuit 500 and configured to control the first converter circuit 501. The interface control circuit 600 further comprises a first transistor circuit 653 configured to receive the analog signal via a first link 651 and to control the pick-up voltage to appear at the third pair of input electrical terminals ("B" and "E"). Specifically, the analog signal pulls down a voltage at the port "E" via the first transistor circuit 653. When the pick-up voltage appears at the third pair of input electrical terminals ("B" and "E"), the coil 602 senses a voltage potential difference between the third pair of input electrical terminals ("B" and "E") and operates. The first converter circuit 501 is further configured to set up the output DC voltage across a port "D" and "D'" with the regulated output current proportional to an input rated current of the external LED luminaire 200 in response to the phase-dimming signal. When the coil 602 operates, the output DC voltage across the port "D" and "D'" is delivered to the pair of output electrical terminals ("J" and "J"). When the phase-dimming signal has not yet been built up, the analog signal remains a low level, and the pick-up voltage does not appear at the third pair of input electrical terminals ("B" and "E"). In this case, the coil 602 remains normally off, and the intermediate voltage from the first pair of input electrical terminals ("H" and "H'") is delivered to the pair of output electrical terminals ("J" and "J") to temporarily operate the external LED luminaire 200, effectively avoiding luminaire turn-on instability.

In FIG. 1, the first power supply circuit 400 comprises a control device 456 and a second converter circuit 450 controlled by the control device 456 and configured to generate the first regulated DC voltage higher than a maximum input operating voltage of the second converter circuit 450. The first regulated DC voltage appears at an output port "A" of the second converter circuit 450 with respect to the first ground reference 255. The second converter circuit 450 is also configured to generate the intermediate voltage compatible to an operating voltage of the external LED luminaire 200. On the other hand, the first converter circuit 501 is configured to receive both the first regulated DC voltage from the output port "A" and the PWM signal via the second link 652 to regulate the output DC voltage less than the first DC voltage with the regulated output current to operate the external LED luminaire 200 in response to the PWM signal. The second converter circuit 450 comprises a first electronic switch 451, one or more first capacitors 452, one or more first switching diodes 453, and a transformer 480 comprising a primary winding 454 connecting in a front end of the first electronic switch 451 and a secondary winding 457. The first electronic switch 451 is configured to turn on and off to respectively charge and discharge the primary winding 454 and to regulate the first regulated DC voltage to be a constant voltage appearing across the one or more first capacitors 452. The one or more first switching diodes 453 may comprise a plurality of diodes connected in parallel to accommodate a large current. The one or more first capacitors 452 may comprise a plurality of capacitors connected in parallel for better filtering performance. In the second converter circuit 450, there may be a first current sensing resistor 455 to monitor an operation of the second converter circuit 450 and to feedback to the control device 456. The second converter circuit 450 may further comprise one or more second capacitors 462, one or more second switching diodes 463, and a tertiary winding 467. When the first electronic switch 451 is turned on and off to respectively charge and discharge the primary winding 454, the intermediate voltage is regulated and appears across the one or more second capacitors 462.

In FIG. 1, the first converter circuit 501 is further configured to regulate the output DC voltage equal to or greater than a minimum input operating voltage of the external LED luminaire 200 to operate thereof when the phase-dimming signal is present. Each time when the phase-dimming signal is changed, the relay switch 601 is controlled to deliver the output DC voltage to operate the external LED luminaire 200 in response to the phase-dimming signal that is changed. The regulated output current, however, presents a constant current reduction in response to the output DC voltage, thereby operating the external LED luminaire 200 in response to the phase-dimming signal. The first converter circuit 501 comprises one or more third capacitors 503, one or more third switching diodes 504, a second electronic switch 502, and a first inductor 505 connecting between the one or more third capacitors 503 and the second electronic switch 502 configured to turn on and off to respectively charge and discharge the first inductor 505 and to regulate the output DC voltage with the regulated output current to operate the external LED luminaire 200 with a dimmable output light. The second electronic switch 502 is further configured to be turned on according to an on-time of the PWM signal and a switching frequency. The on-time of the PWM signal varies according to the phase-dimming signal. A minimum on-time corresponds to a phase-dimming signal that produces a dimmest lighting luminance. The second power supply circuit 500 further comprises a second transistor circuit 530 comprising one or more second transistors 531 configured to build up a switching control signal via a port 532 to turn on the second electronic switch 502 and to enable the first converter circuit 501 when the phase-dimming signal is present, thereby producing the output DC voltage in response to the PWM signal. The first converter circuit 501 further comprises a second current sensing resistor 520 configured to monitor an operation of the first converter circuit 501 and to support regulating the output DC voltage in response to the PWM signal. The one or more third switching diodes 504 may comprise a plurality of diodes connected in parallel to accommodate a large current. The one or more third capacitors 503 may comprise a plurality of capacitors connected in parallel for better filtering performance. In FIG. 1, the transformer 480 may comprise an auxiliary winding 468 whereas the second converter circuit 450 may further comprise a rectified diode 469 configured to sustain a power to operate the control device 456 once the first electronic switch 451 starts to turn on and off.

In FIG. 1, the LED luminaire phase-dimming driver 100 further comprises a first internal power supply circuit 460 configured to down-convert the first regulated DC voltage into a second regulated DC voltage at a port "B" with respect to the first ground reference 255 to supply a power to the pick-up voltage to operate the coil 602. The first internal power supply circuit 460 is also configured to build up the switching control signal that has an amplitude close to the second regulated DC voltage. The LED luminaire phase-dimming driver 100 further comprises a second internal power supply circuit 470 configured to down-convert the second regulated DC voltage into a third regulated DC voltage at a port "C" with respect to the first ground reference 255 to supply a power to the central control circuit 650, thereby sustaining the analog signal and the PWM signal. Note that the one or more second transistors 531 are further configured to up-convert the PWM signal received into the switching control signal with the amplitude close to the second regulated DC voltage, thereby supporting rapid switching of the second electronic switch 502 and producing the output DC voltage in response to the switching control signal.

Figure 2:
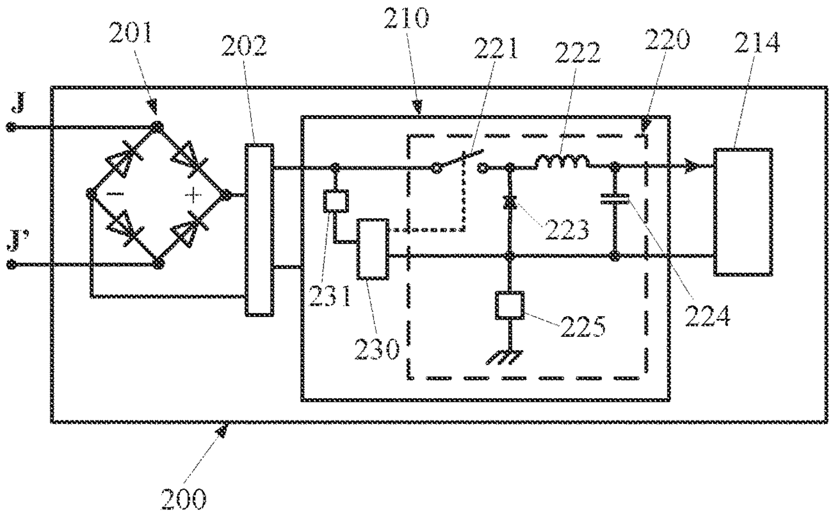
FIG. 2 is a block diagram of an external LED luminaire according to the present disclosure.

FIG. 2 is a block diagram of an external LED luminaire according to the present disclosure. The external LED luminaire 200, a general LED luminaire originally designed as non-dimmable, may comprise an external full-wave rectifier 201, a second EMI filter assembly 202, one or more LED arrays 214, and an LED driving circuit 210 comprising a third converter circuit 220. The LED driving circuit 210 may further comprise an LED driving control device 230 and a start-up resistor 231 configured to provide an operating voltage to enable the LED driving control device 230. When the output DC voltage coming out of the LED luminaire phase-dimming driver 100 is inputted to the external LED luminaire 200, the external full-wave rectifier 201 allows the output DC voltage to pass through the LED driving circuit 210. Because the output DC voltage is equal to or higher than the operating voltage of the LED driving circuit 210, the start-up resistor 231 provides the operating voltage high enough to enable the LED driving control device 230. The third converter circuit 220 may comprise a third electronic switch 221, an inductive energy storing component 222, and one or more fourth capacitors 224. The third converter circuit 220 is configured to receive the output DC voltage with the regulated output current and to produce a fourth DC voltage with a regulated LED driving current to drive the one or more LED arrays 214 in response to the phase-dimming signal. The third converter circuit 220 may further comprise a third current sensing resistor 225 to control the regulated LED driving current. The LED driving control device 230 is also configured to receive a voltage signal from the third current sensing resistor 225 and to control the third electronic switch 221 on and off, thereby regulating an LED driving current according to the regulated output current inputted to the external LED luminaire 200.

Figure 3:
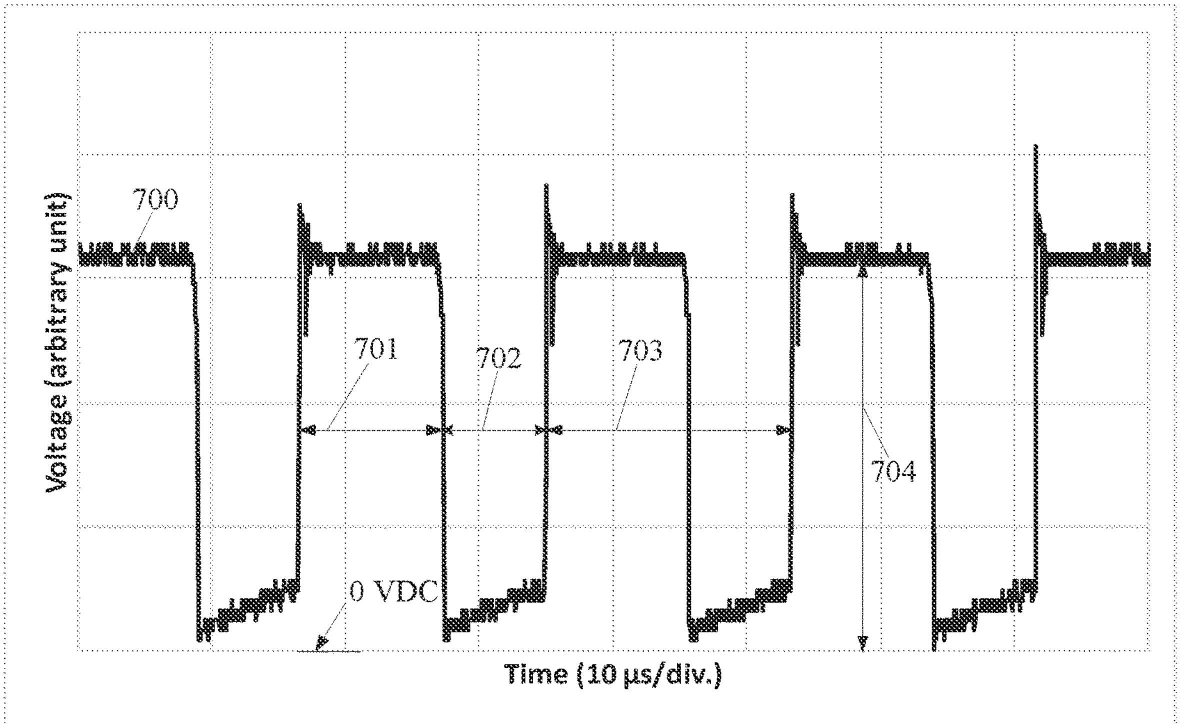
FIG. 3 is an example waveform measured at the second electronic switch sinking a conduction current according to the present disclosure.

FIG. 3 is a first example waveform measured at the second electronic switch 502 sinking a conduction current according to the present disclosure. As mentioned, in FIG. 1, the PWM signal is transmitted from the central control circuit 650 to the second transistor circuit 530 to boost an amplitude of the PWM signal to the switching control signal. The switching control signal can directly drive the second electronic switch 502 on and off. On the other hand, the switching control signal may control the second electronic switch 502 to sink a conduction current to flow into the second electronic switch 502 and the first ground reference 255. In FIG. 3, a sinking voltage corresponding to such a conduction current is used to drive the second electronic switch 502 on and off, thereby regulating the output voltage with a regulated output current. The example waveform 700 corresponds to a least dimming situation with a switch on-time 701 and a switch off-time 702. The second electronic switch 502 is turned on and off and repeats such a sequence every switching time 703 with an amplitude 704 of the switching control signal. The switch on-time 701 and the switch off-time 702 is determined by the PWM signal. When a 50% phase-dimming signal is received, the switch on-time 701 reduces by 50% and the switch off-time 702 varies.

Figure 4:
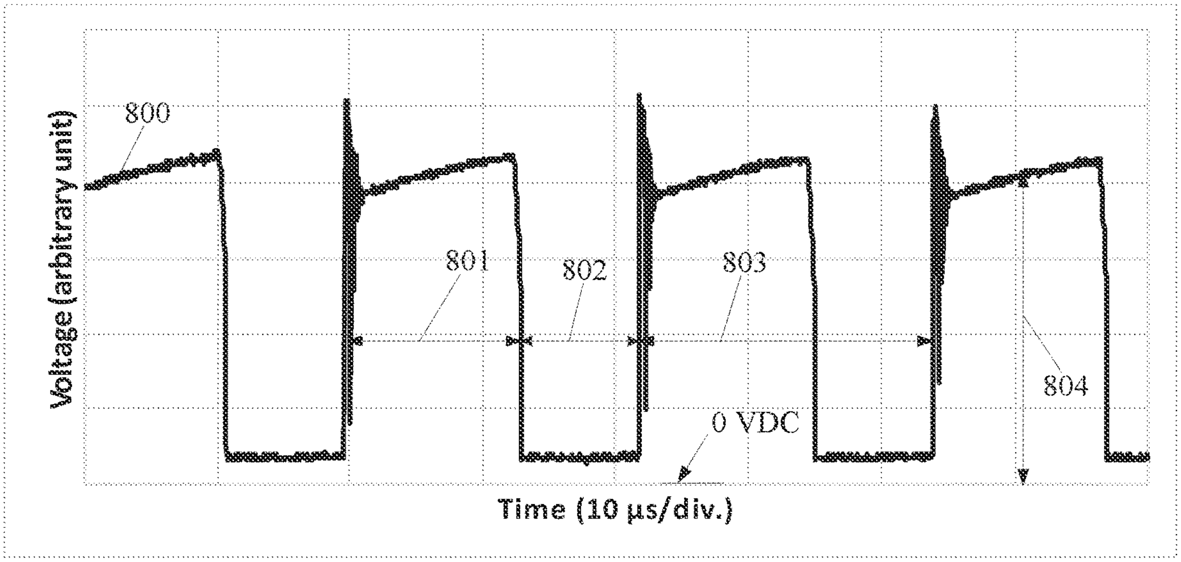
FIG. 4 is a first example waveform measured at the inductive energy storing component according to the present disclosure.

FIG. 4 is a first example waveform measured at the inductive energy storing component 222 in a back end of the third electronic switch 221 according to the present disclosure. Referring to FIG. 2, when a 50% phase-dimming signal is present, the central control circuit 650 sends the PWM signal corresponding to the 50% phase-dimming signal to the first converter circuit 501. The second transistor circuit 530 is configured to build up the switching control signal to turn on the second electronic switch 502 and to enable the first converter circuit 501 to generate the output DC voltage in response to the PWM signal. The output DC voltage coming out of the LED luminaire phase-dimming driver 100 is inputted to the external LED luminaire 200. The third converter circuit 220 is configured to receive the output DC voltage with the regulated output current and to produce the fourth DC voltage with a regulated LED driving current to drive the one or more LED arrays 214 in response to the phase-dimming signal. In FIG. 4, a trace 800 shows an amplitude 804, an on-time 801 and an off-time 802 of the third electronic switch 221 when the output DC voltage with the 50% phase-dimming signal is inputted to the third converter circuit 220. The on-time 801 and the off-time 802 determine a first duty cycle corresponding to the 50% phase-dimming signal. The on-time 801 and the off-time 802 also determine a first switching frequency which is reciprocal of a first switching time 803. The first duty cycle then prescribes a 50% dimming LED driving current according to the regulated output current inputted to the external LED luminaire 200.

Figure 5:
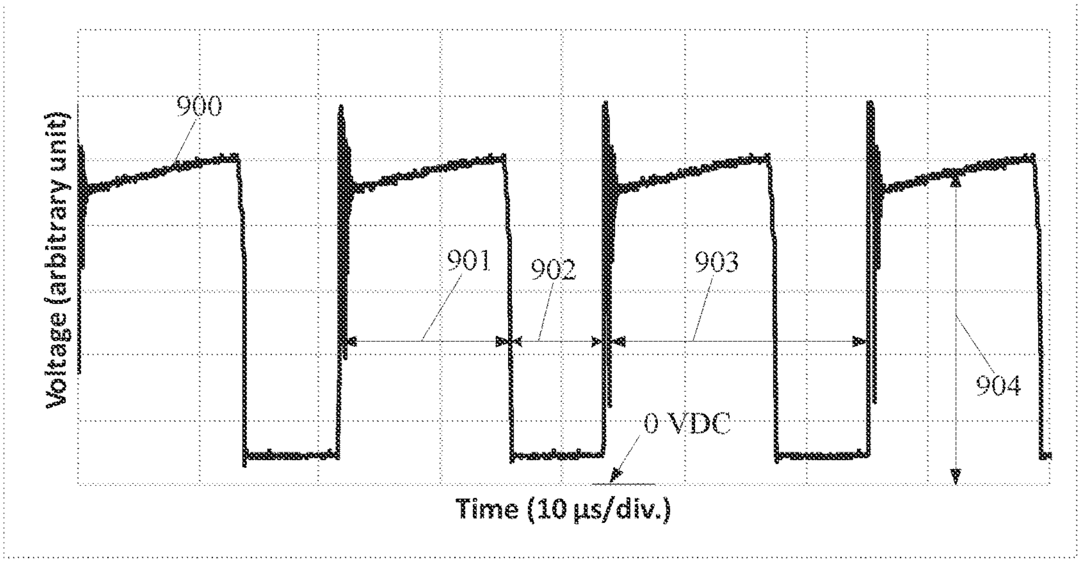
FIG. 5 is a second example waveform measured at the inductive energy storing component according to the present disclosure.

FIG. 5 is a second example waveform measured at the inductive energy storing component 222 in the back end of the third electronic switch 221 according to the present disclosure. Referring to FIG. 2, when the least dimming phase-dimming signal is present, the central control circuit 650 sends the PWM signal corresponding to the 0% phase-dimming signal to the first converter circuit 501. The second transistor circuit 530 is configured to build up the switching control signal to turn on the second electronic switch 502 and to enable the first converter circuit 501 to generate the output DC voltage in response to the PWM signal. The output DC voltage coming out of the LED luminaire phase-dimming driver 100 is inputted to the external LED luminaire 200. The third converter circuit 220 is configured to receive the output DC voltage with the regulated output current and to produce the fourth DC voltage with the regulated LED driving current to drive the one or more LED arrays 214 in response to the least dimming phase-dimming signal. In FIG. 5, a trace 900 shows an amplitude 904, an on-time 901 and an off-time 902 of the third electronic switch 221 when the output DC voltage with the 0% phase-dimming signal is inputted to the third converter circuit 220. The on-time 901 and the off-time 902 determine a second duty cycle corresponding to the 0% phase-dimming signal. The on-time 901 and the off-time 902 also determine a second switching frequency which is reciprocal of a second switching time 903. The second duty cycle then prescribes a least dimming LED driving current according to the regulated output current inputted to the external LED luminaire 200.

Whereas a preferred embodiment of the present disclosure has been shown and described, it will be realized that alterations, modifications, and improvements may be made thereto without departing from the scope of the following claims. Another LED luminaire phase-dimming drivers controllable by a phase-cut dimming controller to control an LED luminaire using various kinds of combinations to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire phase-dimming driver, comprising:

two electrical conductors configured to receive an input voltage, which is either a phase-cut mains voltage from an external phase-dimming controller or a line voltage from alternate-current (AC) mains when the external phase-dimming controller is not present;

at least one full-wave rectifier coupled to the two electrical conductors and configured to convert the input voltage into a non-regulated direct-current (DC) voltage;

a first power supply circuit coupled to the at least one full-wave rectifier and configured to convert the non-regulated DC voltage into a first regulated DC voltage and an intermediate voltage;

a second power supply circuit comprising a first ground reference and a first converter circuit configured to convert the first regulated DC voltage into an output DC voltage with a regulated output current in response to a phase-dimming signal abstracted from the non-regulated DC voltage;

an interface control circuit comprising a relay switch comprising a coil, the relay switch configured to relay either the intermediate voltage or the output DC voltage to an external LED luminaire to operate thereof; and a latching and holding current sustainable circuit configured to compensate for a minimum current to operate the external phase-dimming controller, thereby eliminating a misfire from the external phase-dimming controller to cut a power to the first power supply circuit, wherein:

the relay switch further comprises a first pair of input electrical terminals, a second pair of input electrical terminals, a third pair of input electrical terminals, and a pair of output electrical terminals;

the third pair of input electrical terminals are configured to receive a pick-up voltage to operate the coil;

the first pair of input electrical terminals are configured to receive the intermediate voltage;

the second pair of input electrical terminals are configured to receive the output DC voltage; and the relay switch, when enabled, is further configured to relay the output DC voltage to the pair of output electrical terminals and to operate the external LED luminaire in response to the phase-dimming signal.

2. The light-emitting diode (LED) luminaire phase-dimming driver of claim 1, wherein the interface control circuit further comprises a central control circuit configured to produce both an analog signal and a pulse-width modulation (PWM) signal in response to the phase-dimming signal, and wherein the PWM signal is configured to control the first converter circuit to supply the output DC voltage with the regulated output current.

3. The light-emitting diode (LED) luminaire phase-dimming driver of claim 2, wherein the interface control circuit further comprises a peripheral circuit configured to sample a fraction of the non-regulated DC voltage to deliver to the central control circuit to set up a switching start-time and to produce the phase-dimming signal.

4. The light-emitting diode (LED) luminaire phase-dimming driver of claim 2, wherein the interface control circuit further comprises a first transistor circuit configured to receive the analog signal and to control the pick-up voltage to appear at the third pair of input electrical terminals.

5. The light-emitting diode (LED) luminaire phase-dimming driver of claim 2, wherein the regulated output current is proportional to an input rated current of the external LED luminaire in response to the PWM signal.

6. The light-emitting diode (LED) luminaire phase-dimming driver of claim 2, wherein the first power supply circuit comprises a second converter circuit configured to produce the first regulated DC voltage higher than a maximum input operating voltage of the second converter circuit, and wherein the first converter circuit is configured to receive both the first regulated DC voltage and the PWM signal and to regulate the output DC voltage less than the first regulated DC voltage with the regulated output current to operate the external LED luminaire in response to the PWM signal.

7. The light-emitting diode (LED) luminaire phase-dimming driver of claim 6, wherein the second converter circuit comprises a first electronic switch, one or more first capacitors, one or more first switching diodes, and a transformer comprising a secondary winding and a primary winding connecting in a front end of the first electronic switch, and wherein the first electronic switch is configured to turn on and off to respectively charge and discharge the primary winding and to control the first regulated DC voltage to appear across the one or more first capacitors.

8. The light-emitting diode (LED) luminaire phase-dimming driver of claim 6, wherein the first converter circuit is further configured to regulate the output DC voltage equal to or greater than a minimum input operating voltage of the external LED luminaire to operate thereof when the phase-dimming signal is present.

9. The light-emitting diode (LED) luminaire phase-dimming driver of claim 2, wherein, each time when the phase-dimming signal is changed, the relay switch is controlled to deliver the output DC voltage to operate the external LED luminaire in response to the phase-dimming signal.

10. The light-emitting diode (LED) luminaire phase-dimming driver of claim 7, wherein the second converter circuit further comprises one or more second capacitors, one or more second switching diodes, and a tertiary winding, and wherein, when the first electronic switch is turned on and off to respectively charge and discharge the primary winding, the intermediate voltage is regulated and appears across the one or more second capacitors.

11. The light-emitting diode (LED) luminaire phase-dimming driver of claim 2, wherein the first converter circuit comprises a second electronic switch, one or more third capacitors, one or more third switching diodes, and a first inductor connecting between the one or more third capacitors and the second electronic switch, and wherein the second electronic switch is configured to turn on and off to respectively charge and discharge the first inductor and to regulate the output DC voltage with the regulated output current to operate the external LED luminaire with a dimmable output light.

12. The light-emitting diode (LED) luminaire phase-dimming driver of claim 11, wherein the second electronic switch is also configured to be turned on by sinking a conduction current to flow into the second electronic switch and the first ground reference.

13. The light-emitting diode (LED) luminaire phase-dimming driver of claim 11, wherein the second electronic switch is further configured to be turned on according to an on-time of the PWM signal and a switching frequency.

14. The light-emitting diode (LED) luminaire phase-dimming driver of claim 13, wherein the on-time of the PWM signal varies according to the phase-dimming signal, and wherein a minimum on-time corresponds to a phase-dimming signal that produces a dimmest lighting luminance.

15. The light-emitting diode (LED) luminaire phase-dimming driver of claim 11, wherein the second power supply circuit further comprises a second transistor circuit comprising one or more second transistors configured to build up a switching control signal to turn on the second electronic switch and to enable the first converter circuit when the phase-dimming signal is present, thereby producing the output DC voltage in response to the PWM signal.

16. The light-emitting diode (LED) luminaire phase-dimming driver of claim 15, further comprising a first internal power supply circuit configured to down-convert the first regulated DC voltage into a second regulated DC voltage to supply a power to the pick-up voltage and to build up the switching control signal.

17. The light-emitting diode (LED) luminaire phase-dimming driver of claim 16, further comprising a second internal power supply circuit configured to down-convert the second regulated DC voltage into a third regulated DC voltage to supply a power to the central control circuit, thereby sustaining the analog signal and the PWM signal.

18. The light-emitting diode (LED) luminaire phase-dimming driver of claim 16, wherein the one or more second transistors are further configured to up-convert the PWM signal received into the switching control signal with an amplitude close to the second regulated DC voltage, thereby supporting rapid switching of the second electronic switch and producing the output DC voltage in response to the switching control signal.

19. The light-emitting diode (LED) luminaire phase-dimming driver of claim 1, wherein the external LED luminaire comprises one or more LED arrays and an LED driving circuit comprising a third converter circuit, wherein the third converter circuit comprises an inductive energy storing component, a third electronic switch, one or more fourth capacitors, and a second ground reference, and wherein the third converter circuit is configured to receive the output DC voltage with the regulated output current and to produce a fourth DC voltage with a regulated LED driving current to drive the one or more LED arrays in response to the phase-dimming signal.

* * * * *